Figure 1:
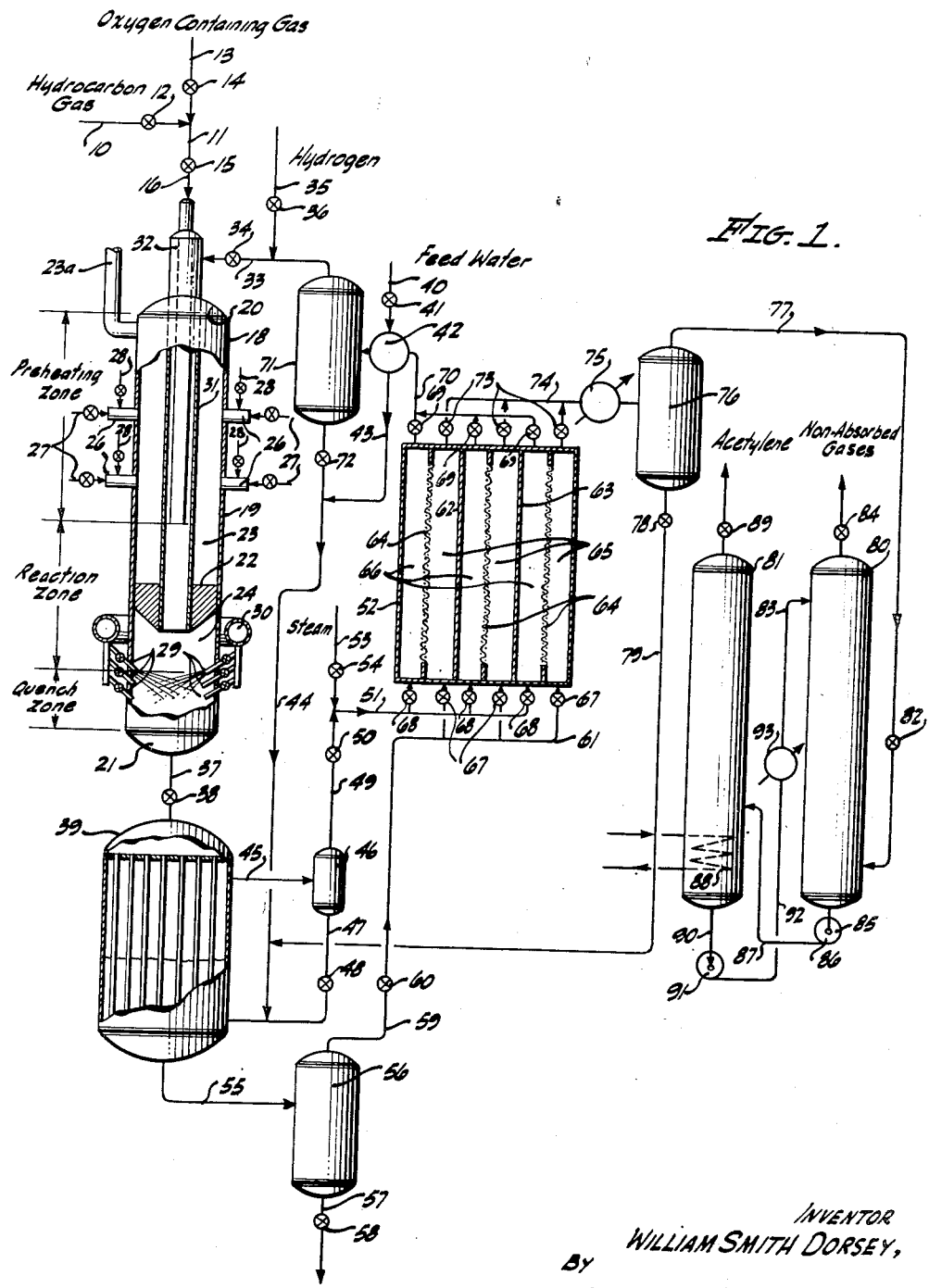

May 25, 1954

W. S. DORSEY 2,679,543

PRODUCTION OF ACETYLENE

Filed May 14, 1951

2 Sheets-Sheet 1

INVENTOR
WILLIAM SMITH DORSEY,
BY
Richard C. Norton
ATTORNEY.

May 25, 1954

W. S. DORSEY 2,679,543

PRODUCTION OF ACETYLENE

Filed May 14, 1951

2 Sheets-Sheet 2

INVENTOR.
WILLIAM SMITH DORSEY,
BY
Richard C. Northtum
ATTORNEY.

Patented May 25, 1954

2,679,543

UNITED STATES PATENT OFFICE 2,679,543

PRODUCTION OF ACETYLENE

William Smith Dorsey, Fullerton, Calif., assignor to Union Oil Company of California, Los Angeles, Calif., a corporation of California Application May 14, 1951, Serial No. 226,206

15 Claims. (Cl. 260—679)

This invention relates to an improved process for the production of acetylene, and in particular concerns a process wherein a hydrocarbon gas or vapor is reacted with oxygen in the presence of hydrogen to produce a hydrogen- and acetylene-containing effluent gas from which the hydrogen is separated and returned to the reaction prior to recovery of the acetylene product.

It is known that acetylene may be produced by the partial oxidation of hydrocarbons, particularly saturated lower aliphatic hydrocarbons such as methane, ethane, propane, natural gas, etc., employing substantially pure oxygen as the oxidizing agent. The reaction is effected in the vapor phase at relatively high temperatures, e. g., above 1000° C., over short periods of time. However, in spite of the fact that acetylene yields as high as 40 per cent of theoretical, based on the hydrocarbon consumed, may be obtained, acetylene processes employing this reaction have not proved commercially practical in this country by reason of the high cost of the substantially pure oxygen required. When it is attempted to operate such processes with air instead of oxygen, the acetylene yield is greatly reduced, and, more importantly, large quantities of carbon black are formed within the reactor, thereby giving rise to serious mechanical difficulties. Also, thermal requirements are much higher since four parts of inert nitrogen must be heated to the high reaction temperature for every part of oxygen employed, and higher temperatures are required to promote the reaction because of the low partial pressure of the oxygen reactant.

It is accordingly an object of the present invention to provide an improved process for the production of acetylene by the partial oxidation of hydrocarbons.

Another object is to provide a process whereby acetylene may be produced from hydrocarbons in yields higher than those attained heretofore.

A further object is to provide a process whereby hydrocarbons, particularly normally gaseous saturated aliphatic hydrocarbons, are caused to react with air to form acetylene in yields as good or better than those heretofore realized in processes employing pure oxygen as the oxidizing agent.

Other objects will be apparent from the following detailed description of the invention, and various advantages not specifically referred to herein will occur to those skilled in the art upon employment of the invention in practice.

I have now found that the above and related objects may be realized in a process based on the discovery that a highly exothermic reaction between hydrocarbons and oxygen to produce acetylene may be induced by admixing hydrogen with a suitably preheated reactant gas mixture comprising the hydrocarbon and oxygen, and that by limiting the period of time over which such reaction is allowed to take place the acetylene product may be obtained in relatively high yield, e. g., 40–50 per cent based on the amount of hydrocarbon consumed, even when the oxygen is provided in the form of air. Carbon formation is substantially nil, and highly efficient tubular reactors may be employed without becoming clogged. The reaction induced by the addition of hydrogen to the preheated reactant gas is more highly exothermic than that involved in the previously known processes, and accordingly the heat requirements of the present reaction are lower. Substantially the only heat consumed is that required to preheat the reactant gas, and by employing specially designed reactors, as hereinafter more fully described, the hot product gas may be used to preheat the reactant gas so that the reaction can be effected autothermically, i. e., without the consumption of substantial heat supplied from exterior sources.

While the chemical reaction upon which the present process is based is induced or initiated by the addition of hydrogen to a preheated reactant gas, it is characteristic of such reaction that there is no net consumption of hydrogen. In many instances there is an actual production of hydrogen, i. e., the product gas contains a greater amount of hydrogen than was employed in initiating the reaction. In any case the product gas will comprise at least as much hydrogen as was employed initially. A typical product gas, obtained from a reactant gas mixture consisting of methane and air, comprises on a water-free basis:

| | Percent by volume |
|---|---|
| Acetylene | 3.6 |
| Methane | 5.0 |
| Ethylene | 0.4 |
| Carbon monoxide | 5.7 |
| Carbon dioxide | 0.5 |
| Nitrogen | 42.8 |
| Hydrogen | 42.0 |
| | 100.0 |

In order to adapt the above-described method for forming acetylene to commercially feasible operation it is essential that the hydrogen be recovered from the product gas and re-employed to initiate the acetylene-producing reaction. It is also necessary that the acetylene product be recovered in substantially pure form. However, if the product gas is first treated for the separation of the acetylene, as by selective adsorption or solvent extraction, and then for separation of the hydrogen in a form suitable for re-use in the acetylene-producing reaction, efficient recovery of the acetylene in substantially pure form is both difficult and expensive by reason of the initial low concentration of acetylene in the product gas. Accordingly, economically practical operation requires that the hydrogen be separated first, and the acetylene recovered later. I have found that this sequence of operations can best be accomplished by subjecting the product gas to a sweep diffusion operation, whereby the hydrogen is directly recovered in a form suitable for return to the acetylene-producing reaction, and thereafter separating the acetylene by selective adsorption, solvent extraction or other suitable means. This particular combination and sequence of separation steps cooperates directly with the acetylene-producing step to form an integrated process possessing a number of operational and economic advantages. Thus, the sensible heat of the product gas may be employed to produce the steam which is preferably employed as the sweep gas in the sweep diffusion separation of hydrogen, and since the hydrogen so separated is employed to induce the formation of a further quantity of hot product gas, the reaction step and the sweep diffusion step are mutually assistive. The hydrogen is obtained directly in a form suitable for re-use, and recovery of the acetylene is improved. Moreover, as is more fully explained hereinafter, under some conditions it is definitely advantageous that the gas from which the acetylene is recovered contains a relatively large quantity of nitrogen. Other advantages inherent in the process of the invention will be apparent as the description thereof proceeds.

Figure 2:
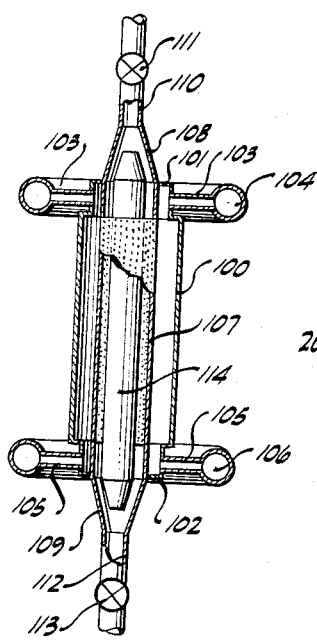
Figure 3:
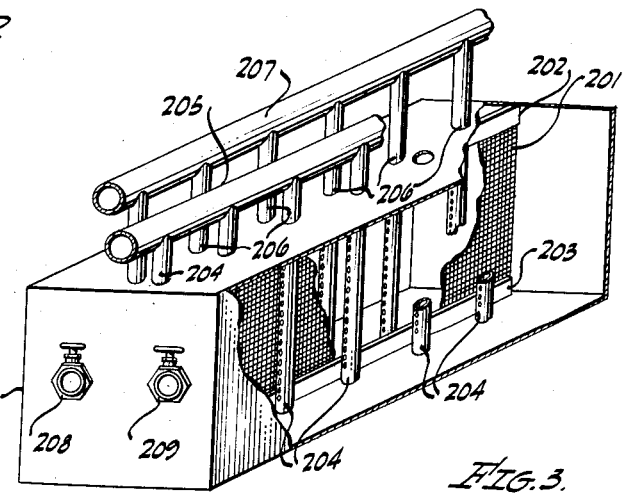
Figure 4:
Figure 5:
Figure 7:
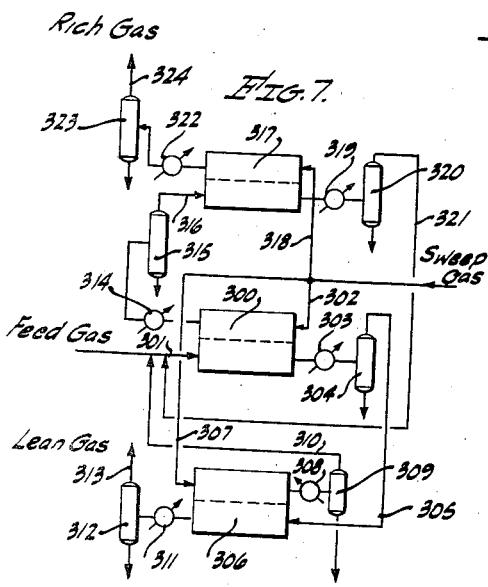
Figure 6:
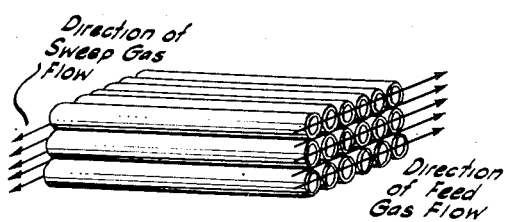

The process of the invention and its manner of operation will be readily apparent upon reference to the accompanying drawings, in which Figure 1 represents a schematic flow diagram of a process embodying the principle of the invention; Figure 2 illustrates one form of sweep diffusion apparatus, Figure 3 illustrates another form of sweep diffusion apparatus; Figures 4 and 5 illustrate alternative forms which certain elements of the apparatus of Figure 3 may take; Figure 6 represents a form of sweep diffusion barrier; and Figure 7 represents a schematic flow diagram illustrating one way of carrying out the sweep diffusion separation step in a plurality of stages.

Referring now to Figure 1, a hydrocarbon gas or vapor such as methane or natural gas is introduced into line 10 and passes into feed conduit 11 at a rate controlled by valve 12. Simultaneously, an oxygen-containing gas such as air is introduced into line 13 and passes into feed conduit 11 at a rate controlled by valve 14. The gas mixture within conduit 11 constitutes the reactant gas, and passes via valve 15 and line 16 into acetylene reactor 18.

Reactor 18 comprises an elongated vessel having cylindrical side-walls 19 and upper and lower closures 20 and 21, respectively. An internally disposed partition or plug 22 divides the reactor into an upper furnace compartment 23 and a lower quenching compartment 24. Burners 26, provided with fuel and air supply lines 27 and 28, respectively, fire into furnace compartment 23. A stack 23a communicating with furnace compartment 23 serves for the withdrawal of the flue gas produced by burners 26. Spray nozzles 29 are arranged to inject a liquid cooling medium, e. g., water, supplied from manifold 30 into quenching compartment 24 at selected points along the length thereof. Outer tube 31 is centrally disposed within reactor 18 and extends through furnace compartment 23, communicating between quenching compartment 24 and the exterior. Outer tube 31 is closed at its exterior end to receive coaxially positioned inner tube 32 which extends within outer tube 31 to a point within furnace compartment 23. Inlet means are provided for introducing gases into inner tube 32 and into the annular space between inner tube 32 and outer tube 31, and outlet means are provided for withdrawing gas from quenching compartment 24.

The reactant gas is introduced into inner tube 32 of the reactor and is heated to a moderately high temperature, e. g., 600° C. or above, during its passage therethrough, heat being supplied by burners 26. Simultaneously, a recycle stream of hydrogen is introduced into the annular space between inner tube 32 and outer tube 31 from line 33 at a rate controlled by valve 34. Make-up hydrogen may be introduced into line 33 via line 35 and valve 36 from an exterior supply, not shown. The hydrogen introduced into outer tube 31 passes through the annular space between tubes 31 and 32, and therein becomes preheated to the aforesaid moderately high temperature. At the terminus of inner tube 32 within outer tube 31 the preheated reactant gas and hydrogen become mixed and the acetylene-producing reaction occurs. Those portions of tubes 31 and 32 which are co-extensive within furnace compartment 24 thus constitute preheating zones for the hydrogen and reactant gas, respectively.

The acetylene-producing reaction takes place as the gases pass through that portion of tube 31 which extends beyond tube 32, and is terminated when the gases are quenched within quenching compartment 24 by the liquid quenching medium introduced through nozzles 29. The reaction zone thus extends from the inner terminus of tube 32 to the point where the reacting gases are quenched. The time of passage of the gases through this zone, i. e., the reaction time, may be varied by suitably controlling the flow rate of the gases through the reactor, and/or by varying the point at which the gases are quenched by suitably selecting an upper or lower set of spray nozzles 29.

The quenched product gas is withdrawn from reactor 18 by means of line 37 at a rate controlled by valve 38 and is passed to a waste heat boiler 39 wherein the sensible heat of the quenched product gas is employed to produce steam which is employed in the subsequent sweep diffusion operation. In order to conserve the heat content of the product gas, which is produced at a temperature of 1100°–1500° C., the quantity of quenching liquid supplied to quenching compartment 24 is preferably limited to the amount required merely to terminate the reaction. Preferably, the product gas is withdrawn from the reactor at a temperature of about 500°–600° C. so that the quenched product gas which is introduced into waste heat boiler 39 will have sufficient sensible heat to generate a substantial part of the steam required in the subsequent sweep diffusion operation. Waste heat boiler 39 is shown as being of the tube-and-shell type, with the hot product gas passing through the tubes. Feed water is introduced into boiler 39 from line 40 at a rate controlled by valve 41 via feed water preheater 42 and lines 43 and 44. Steam is withdrawn from boiler 39 by means of line 45, and is passed to condensate separator 46 wherein condensate water is separated and returned to the boiler via line 47 at a rate controlled by valve 48. The steam is withdrawn from separator 46 through line 49 at a rate controlled by valve 50, and is introduced into manifold 51 associated with sweep diffusion unit 52. Line 53 and valve 54 are provided for the introduction into manifold 51 of whatever steam might be required by sweep diffusion unit 52 over and above that supplied from the waste heat boiler.

The product gas which passes through the tubes of waste heat boiler 39 is cooled therein, and a considerable quantity of vaporized quenching fluid is condensed. The mixture of product gas and condensed quenching liquid is withdrawn from boiler 39 through line 55 and passed to separator 56 wherein the condensed quenching liquid is separated and drawn off through line 57 at a rate controlled by valve 58. The product gas is withdrawn from separator 56 through line 59 at a rate controlled by valve 60 and is passed to manifold 61 associated with sweep diffusion unit 52.

Sweep diffusion unit 52 is shown as comprising three separation stages arranged in parallel, and consists simply of an elongated closed vessel internally divided by means of longitudinal partitions 62 and 63 into three identical compartments, each of which constitutes a single separation stage. Each of said compartments is subdivided by means of a longitudinal screen or perforate barrier 64 into an acetylene retention zone 65 and a hydrogen reception zone 66. Gas introduction and withdrawal means are provided at opposite ends of each of said zones. The cooled product gas is introduced into each of the acetylene retention zones 65 from manifold 61 at a rate controlled by valves 67. Simultaneously, steam is introduced into each of the hydrogen reception zones 66 from manifold 51 at a rate controlled by valves 68. Within each compartment the lightest component of the product gas introduced into the acetylene retention zone 65, i. e., the hydrogen, preferentially diffuses through barrier 64 and into hydrogen reception zone 66 by reason of its higher rate of diffusion. The steam which is introduced into hydrogen reception zone 66 serves to sweep the diffused hydrogen away from the barrier and thereby prevent diffusion in the reverse direction. Accordingly, as the product gas passes through acetylene retention zone 65 it becomes depleted in hydrogen so that the gas withdrawn from the opposite end of said zone is lean in hydrogen and enriched in acetylene. Since a part of the steam which is introduced into the hydrogen reception zone passes through the barrier into the acetylene retention zone, the gas withdrawn from the latter zone will contain steam. The gas withdrawn from the hydrogen reception zone will also contain steam as well as the hydrogen which has diffused through the barrier.

The mixture of steam and hydrogen is withdrawn from each of the hydrogen reception zones 66 of sweep diffusion unit 52 at a rate controlled by valve 69, and is passed via manifold 70 into boiler feed water preheater 42 wherein the steam is condensed by indirect heat exchange against the boiler feed water. The mixture of hydrogen and steam condensate is then passed to a separator 71 from which the hydrogen is taken overhead and returned to acetylene reactor 18 via line 33. The condensate is withdrawn from separator 71 at a rate controlled by valve 72 and returned to waste heat boiler 39 via line 44.

The acetylene-enriched gas is withdrawn from each of the acetylene retention zones 65 of sweep diffusion unit 52 at a rate controlled by valve 73, and is passed via manifold 74 through a cooler 75 wherein the steam is condensed. The mixture of gas and condensate is then passed to a separator 76 from which the non-condensed acetylene-containing gas is taken overhead and passed to an acetylene recovery system through line 77. The condensate is withdrawn from separator 76 at a rate controlled by valve 78 and returned to waste heat boiler 39 via line 79.

The acetylene-recovery system shown is of the solvent extraction type comprising an absorption tower 80 and a rectification tower 81. The acetylene-containing gas which is withdrawn from separator 76 through line 77 is passed to the bottom of absorption tower 80 at a rate controlled by valve 82. Within tower 80 the gas rises countercurrent to a descending stream of solvent introduced into the top of the tower from line 83. The non-absorbed gases are withdrawn from the top of tower 80 at a rate controlled by valve 84 and are passed to secondary recovery or disposal means, not shown. The rich absorbent is withdrawn from the bottom of absorption tower 80 through line 85 and is passed by means of pump 86 and line 87 to rectification tower 81. The latter is provided with internal heating means, such as a steam coil 88, whereby the rich absorbent is heated to drive off the dissolved acetylene. The latter is withdrawn from tower 81 at a rate controlled by valve 89 and is passed to storage. Lean absorbent is withdrawn from the bottom of tower 81 through line 90 and is passed by means of pump 91 and line 92 to a cooler 93, and thence returned to absorption tower 80 via line 83.

It will be seen from the foregoing description that the process of the invention comprises four essential operations, the first three of which mutually co-operate in producing an acetylene-containing product gas in a highly advantageous and economical manner: (1) a reaction step wherein a hydrocarbon, oxygen (or air) and hydrogen are employed to produce a hot product gas comprising acetylene and hydrogen; (2) a sweep gas production step wherein the sensible heat of the hot product gas is employed to produce a condensible sweep gas; (3) a sweep diffusion step wherein the condensible sweep gas produced in step (2) is employed to separate hydrogen from the product gas, which hydrogen is returned to step (1); and (4) an acetylene recovery step wherein the acetylene is separated from the remaining components of the product gas.

*The reaction step*

The reaction step consists essentially in (1) preheating a reactant gas comprising a hydrocarbon gas or vapor and oxygen to a moderately high temperature such that upon admixing of the preheated reactant gas with hydrogen there ensues an exothermic acetylene-producing reaction in which a temperature of 1100°–1500° C. is attained, (2) admixing the preheated reactant gas with hydrogen whereby said reaction occurs and said high temperature is attained, and (3) cooling the hot product gas which is thereby formed to a temperature at which substantially no further reaction occurs within 0.001–0.05 second after admixture of the reactant gas and hydrogen. Said step is disclosed and claimed by John L. Bills in application Serial No. 240,728, filed August 7, 1951.

A wide variety of hydrocarbon reactants may be employed, but best results are obtained with non-aromatic hydrocarbons, particularly those which are normally gaseous or liquid and boil below about 400° C. under atmospheric pressure. The term "non-aromatic hydrocarbon" is herein employed as a generic term including saturated and unsaturated aliphatic and cycloaliphatic hydrocarbons but excluding aromatic or benzenoid hydrocarbons. The normally gaseous saturated aliphatic hydrocarbons, particularly methane and natural gas, are especially preferred by reason of their low cost, ease of handling and high conversion to acetylene. Hydrocarbon mixtures, e. g., mixed refinery gases and various petroleum distillates, are also suitable. When employing a liquid hydrocarbon reactant, it is preferably vaporized prior to its admixture with the oxygen and/or prior to being preheated, although such vaporization may be effected as a part of the preheating step. The oxygen reactant may be pure oxygen itself, oxygen-enriched air, ordinary air, or any other gas containing free oxygen. Air is preferred by reason of its lack of cost, and it is one of the features of the process that the results obtained employing air are comparable or better than those of previous processes in which pure oxygen has been employed. The mole ratio of hydrocarbon to oxygen in the reactant gas varies between rather wide limits depending upon the identity of the hydrocarbon component. When the hydrocarbon is one of relatively high molecular weight, e. g., a petroleum distillate such as kerosene, as many as 50 moles of oxygen should be provided per mole of hydrocarbon. On the other hand, when the hydrocarbon is a normally gaseous saturated aliphatic hydrocarbon, e. g., methane, natural gas, ethane, etc., an excess of the hydrocarbon is employed so that the mole ratio of hydrocarbon to oxygen is suitably between about 1.33/1 and about 2.0/1. Thus, the mole ratio of hydrocarbon to oxygen varies from about 0.02/1 to about 2.0/1 depending upon the nature of the hydrocarbon. When the oxygen reactant is in the form of air and the hydrocarbon is methane or natural gas, the reactant gas preferably comprises between about 17 and about 30 per cent by volume of the hydrocarbon and, correspondingly, between about 83 and about 70 per cent by volume of air. When the reactant gas comprises air and a petroleum distillate such as kerosene, it may contain between about 4 and about 10 per cent by volume of the hydrocarbon vapor and between about 96 and about 90 per cent by volume of air.

The hydrogen which is admixed with the preheated reactant gas to initiate or induce the acetylene-producing reaction may be pure hydrogen or in the form of a mixture of free hydrogen and an inert gas which does not react with the other components of the system under the conditions existing during the reaction, e. g., nitrogen, carbon monoxide, carbon dioxide, water vapor, etc. The term "hydrogen-containing recycle gas" is herein employed to define a gas which is separated in a subsequent step of the process and returned to the reaction step, and which may comprise substantially pure hydrogen as well as mixtures comprising free hydrogen and substantially inert components of the product gas which is obtained from the reaction step. Employment of the hydrogen in admixture with such components of the product gas is usually more economical than the use of pure hydrogen. The product gas for the most part comprises hydrogen, nitrogen and carbon monoxide in addition to unreacted hydrocarbon and the acetylene product. While it is possible to operate the sweep diffusion operation so as to separate substantially pure hydrogen for recycling back to the reaction step, it is much simpler to separate the hydrogen in admixture with a part of the nitrogen and/or carbon monoxide, carbon dioxide and unreacted hydrocarbon, and to employ such mixture as the recycle gas. Such mixture may comprise as much as about 70 per cent by volume of substantially inert components. Accordingly, the hydrogen-containing gas employed in the reaction step may comprise from about 30 to 100 per cent by volume of hydrogen and from about 70 to zero per cent by volume of substantially inert components of the product gas. However, since the presence of the inert components in the reaction zone tends to lower the high temperature attained therein, the use of hydrogen mixtures containing relatively large proportions of inert components requires the use of higher preheat temperatures in order to secure the necessary high reaction temperature, thereby increasing the heat requirements of the process. On the other hand, the cost of separating the recycle gas in the sweep diffusion operation increases with the hydrogen content of such gas. Accordingly, the optimum concentration of the hydrogen-containing recycle gas will be determined by balancing the cost of separating such gas from the product gas against the cost of supplying additional heat during preheating. Usually the optimum recycle gas mixture will contain at least about 85 per cent by volume of hydrogen and less than about 15 per cent by volume of substantially inert components of the product gas. Such inert components usually consist mainly of nitrogen, carbon monoxide and mixtures of nitrogen and carbon monoxide. Small amounts of unreacted hydrocarbon, e. g., up to about 10 per cent by volume, may also be tolerated.

Preferably, but not necessarily, the hydrogen-containing recycle gas is preheated to substantially the same temperature as the preheated reactant gas prior to being admixed therewith. The heating means employed may be the same as those provided for preheating the reactant gas, as is shown in reactor 18 of Figure 1, or they may be independent. The amount of recycle gas employed may be varied considerably. Usually, however, from about 0.5 to about 5 moles, preferably from about 1.5 to about 3 moles, of hydrogen are provided for mole of hydrocarbon in the reactant gas, although by the use of a special technique more fully referred to hereinafter the amount of hydrogen required may be reduced to as low as about 0.1 mole of hydrogen per mole of hydrocarbon reactant.

The temperature to which the reactant gas is preheated prior to its admixture with the hydrogen-containing gas is such that the temperature attained in the exothermic acetylene-producing step which takes place upon said admixing is between about 1100° C. and about 1500° C., preferably between about 1275° C. and about 1375° C. It is a unique characteristic of the process that the reactant gas can be preheated to relatively high temperatures, e. g., 600°–1150° C., in the absence of hydrogen without reaction occurring to any substantial extent, but when the reactant gas is admixed with hydrogen at such temperatures an exothermic acetylene-producing reaction takes place spontaneously and without the addition of any further substantial quantity of heat. As a result of such reaction occurring, the temperature of the reacting gas rises very rapidly to much higher values. Maximum yields of acetylene are obtained when such reaction temperature is between about 1100° C. and about 1500° C. The temperature to which the reactant gas must be preheated to secure a reaction temperature within this range depends upon a number of factors, including the composition of the reactant gas, the period of time in which the preheating is effected, and the amount of turbulent mixing of the reactant gas components which may take place during the preheating. All of these factors are variables which contribute to the possibility of reaction occurring between the reactant gas components during the preheating in the absence of added hydrogen. Inasmuch as it is desirable to avoid such reaction, these variables should be so controlled that the preheat temperature sufficient to attain the desired subsequent reaction temperature is not so high that reaction between the components of the reactant gas takes place to any substantial extent during the preheating. With reactant gas mixtures of the composition previously given it is usually desirable to preheat as rapidly as possible, e. g., in from about 0.005 to about 0.5 second, and to avoid obstructed flow that would increase turbulent mixing during the preheating. Thus, it is usually desirable to combine the components of the reactant gas prior to preheating the same, and to pass the mixture through the preheating zone at a relatively high velocity. Under ordinary conditions of operation the preheat temperature will be between about 600° C. and about 1150° C. and the preheat time will be between about 0.005 and about 0.1 second.

The reaction time, i. e., the time interval between admixture of the preheated reactant gas with the hydrogen-containing recycle gas and the cooling of the product gas to a temperature at which substantially no further reaction occurs, varies inversely with the reaction temperature. Shorter reaction times are employed at the higher reaction temperatures, and vice versa. Such time is between about 0.001 and about 0.05 second, preferably between about 0.002 and about 0.02 second, and is readily controlled by varying the rate at which the gases are introduced into and are withdrawn from the reaction zone. The maximum temperature at which substantially no further reaction takes place depends somewhat upon the composition of the reactant gas, but is ordinarily about 600°–650° C. However, since as much as possible of the sensible heat of the product gas should be conserved for use in the subsequent sweep gas production step, the product gas should not be cooled any more than is necessary to arrest the reaction within the stated period of time. Thus, the temperature to which the product gas is cooled should be below, but not greatly below, the maximum temperature at which substantially no further reaction takes place. Stated alternatively, the product gas should be cooled to a temperature at which substantially no further reaction occurs but which is substantially above the boiling point of the sweeping medium employed in the subsequent sweep diffusion separation of the hydrogen-containing recycle gas. Such temperature is preferably between about 500° C. and about 600° C., but may be considerably lower, e. g., 200°–500° C.

The reaction step may be effected in a variety of ways, but in essence consists in passing the reactant gas through a preheating zone wherein it is preheated to the requisite preheat temperature, thence through a reaction zone wherein it is admixed with the hydrogen-containing recycle gas and the exothermic acetylene-producing reaction takes place, and thence through a quenching zone wherein the hot product is cooled as above described. In the reactor illustrated in Figure 1 the extent of these zones is designated, and only one set of such zones is provided. It will be apparent, however, that a plurality of such zones may be provided within a single reactor. Alternatively, a plurality of preheating zones may be arranged to feed into a common reaction zone which in turn feeds into a common quenching zone. If desired, a reactor of the type described in my co-pending application Serial No. 217,633, filed March 26, 1951, may be employed. Such reactor comprises a plurality of parallel sets of preheating, reaction and quenching zones arranged in inverse order so that each preheating zone is adjacent to and in heat exchange relationship with a quenching zone, and each reaction zone is adjacent to and in heat exchange relationship with another reaction zone. Such type of reactor has extremely high thermal efficiency, and may even be operated autothermically, since the heat removed by quenching is employed for preheating the reactant gas. Alternatively, a reactor of the type described in my copending application Serial No. 219,936, filed April 9, 1951 may be employed. Such reactor provides for introduction of a plurality of streams of preheated reactant gas into the central portion of an elongated reaction zone, and for introduction of the hydrogen-containing recycle gas adjacent the walls of the reaction zone so that a film of recycle gas is interposed between said walls and the reactant gas. Such reactor permits a very substantial reduction in the amount of hydrogen required. Other means of effecting the herein described reaction step will be apparent to those skilled in the art, and any suitable engineering technique may be applied thereto.

*The sweep gas production step*

Immediately following the reaction step described above, the product gas which is obtained therefrom at a temperature usually between about 500° C. and about 600° C. is passed to a sweep gas production step wherein it is further cooled and the sensible heat thereof is employed to vaporize a liquid whose vapor is suitable for use as the sweep gas in the subsequent sweep diffusion separation of the hydrogen-containing recycle gas. This operation is suitably carried out in a conventional waste heat boiler through which the product gas is passed in indirect heat exchange relationship with the liquid to be vaporized. Various types of apparatus are suitable for such operation, and the design and construction of such apparatus according to the temperatures, flow rates, materials of construction, and identity of the fluids involved is well understood in the chemical engineering art. Inasmuch as any readily condensible gas or vapor which is inert with respect to the product gas components may be employed as the sweep gas in the subsequent sweep diffusion operation, a variety of liquids may be vaporized to produce the sweep gas. Water is of course eminently satisfactory by reason of its low cost, but other inert liquids, particularly those of relatively low boiling point and low heats of vaporization may also be used, e. g., acetone, ethyl alcohol, gasoline or other liquid hydrocarbons, chlorinated hydrocarbons, etc. may be employed instead. Since, in the following sweep diffusion operation, the sweep gas is separated from the separated hydrogen-containing recycle gas by condensation, the feed for the waste heat boiler will most economically comprise such condensate with only sufficient fresh feed being added to make up for handling losses. Thus, the sweep medium will be continuously circulated within the system, being alternately vaporized and condensed therein. If desired, the condensate may be preheated, e. g., by indirect heat exchange against flue gases, prior to its introduction into the waste heat boiler. Also, if desired, recycling of the sweeping medium may be omitted, fresh feed being supplied to the waste heat boiler from exterior sources. The essence of the sweep gas production step lies in employing the sensible heat of the product gas to vaporize a liquid and thereby produce a gas or vapor suitable for use as the sweep gas in the subsequent sweep diffusion operation.

The sweep diffusion operation

The sweep diffusion step serves to separate from the product gas a hydrogen-containing gas suitable for re-use as such in the reaction step as previously explained. The sweep diffusion separation of gas mixtures is based on the different rates of diffusion through a porous barrier or screen of the components of the gas mixture being treated, and is characterized by the use of an auxiliary gas, termed a "sweep gas," to remove the diffused component away from the diffusion barrier thereby minimizing rediffusion of said component back through the barrier and into the gas mixture from which it originally diffused. In essence, the process consists in passing the feed gas mixture along and more or less parallel to one side of a diffusion barrier, and passing the sweep gas in the same manner along the other side of the same barrier. In accordance with the laws of diffusion, the lowest molecular weight component of the feed gas mixture preferentially diffuses through the barrier to the sweep gas side thereof and is picked up by the sweep gas and carried away from the immediate vicinity of the barrier. The feed gas thus becomes depleted (or "lean") with respect to the lightest component thereof as it passes along the barrier. At the same time, however, it becomes enriched with respect to the sweep gas as a result of the latter diffusing through the barrier to the feed gas side thereof. The process thus operates on two input streams, namely, the feed gas mixture and a suitable sweep gas, and produces two product streams, namely, a rich gas comprising the lightest component of the feed gas mixture in admixture with the sweep gas, and a lean gas comprising the heavier components of the feed gas mixture likewise in admixture with the sweep gas. By employing as the sweep gas a gas or vapor which is more or less easily condensed, separation of the sweep gas from each of the product streams is readily effected at low cost. As pointed out above, steam is most conveniently employed as the sweep gas, but other inert condensible gases may be used if desired.

Unlike gas separation processes which are based on thermal diffusion, the sweep diffusion operation does not require the establishment of any temperature differential, i. e., it operates at a substantially constant and uniform temperature, and may be carried out at any desired temperature above the condensation temperature of the sweep gas. When steam is employed as the sweep gas, operating temperatures only slightly above 100° C. may be employed, and the only heat that need be supplied to the operation is that required to prevent condensation of the sweep gas brought about by loss of heat to the atmosphere. Through the use of suitable thermal insulation, such loss of heat may be substantially eliminated. With lower boiling sweeping media, lower operating temperatures may be employed.

The sweep diffusion operation likewise differs in principle from the so-called gaseous diffusion or gaseous effusion process. The latter requires the establishment of a pressure differential across a porous diffusion barrier, and is based on the fact that a low molecular weight gas will diffuse through the barrier from the high pressure to the low pressure side thereof more readily than a gas of higher molecular weight. Such operation requires the use of vacuum pumps or gas compressors, or both, and a barrier having very minute pores in order to maintain the necessary pressure differential across the barrier. The sweep diffusion operation, however, operates at substantially constant and uniform pressure, and in fact it is essential that the pressure differential across the barrier be as small as possible, e. g., of the order of a few hundredths of an inch of water, in order to prevent mechanical flow through the barrier. Accordingly, the only compression involved is that required to pass the feed and sweep gases along their respective sides of the barrier. Also, the barrier may be a simple perforated or slotted metal or ceramic septum or a woven metal or glass screen, and may be of planar or circular shape.

The size of the openings in the barrier may be varied between wide limits. However, since it is desirable to maintain substantially streamline flow of the feed and sweep gases along their respective sides of the barrier, the openings should not be so large with respect to the thickness of the barrier as to cause excessive turbulence of the gas streams which pass perpendicular to the openings. On the other hand, a barrier having extremely small holes is expensive to manufacture and is subject to becoming plugged or clogged with minute solid particles. Usually, the barrier is constructed of relatively thin sheet material, e. g. sheet metal of 0.005–0.2 inch thickness, in which case the openings may be between 0.005 and about 0.1 inch wide. With thicker barriers, larger sized openings may readily be tolerated. Figure 6 shows a type of barrier construction suitable for use in large units of high gas capacity. Such a barrier consists simply of a stack of pipes or tubes, say, from 0.5–3 inches in diameter and from 1–10 feet long. The feed and sweep gases are passed parallel to the plane of the open ends of the tubes as indicated, and diffusion occurs through the tubes and through the spaces between the tubes.

The sweep diffusion apparatus may take various forms, and may constitute any desired number of single-stage units arranged in series, parallel, or series-parallel order. Figure 2 illustrates one form of such a single-stage unit. Said unit comprises a closed cylindrical body 100, having an upper end-portion 101 and a lower end-portion 102 of reduced diameter. Conduits 103 communicate between end-portion 101 and manifold 104 which is connected to a source of sweep gas, not shown. Conduits 105 communicate between end-portion 102 and manifold 106 which serves for the withdrawal of rich gas. A cylindrical diffusion barrier 107, constructed of perforated sheet metal, is centrally disposed within body 100, being supported by upper and lower throat portions 108 and 109, respectively. Upper throat portion 108 communicates with lean gas withdrawal conduit 110 and valve 111, and lower throat portion 109 communicates with feed gas inlet 112 and valve 113. A tapered cylindrical baffle 114 is centrally positioned within cylindrical barrier 107 and serves to direct the feed gas introduced into inlet 112 longitudinally along the barrier and perpendicular to the openings therein. The operation of this unit is as follows: The feed gas, which comprises hydrogen, nitrogen, carbon monoxide, acetylene, and minor amounts of other gases, is introduced into the unit through feed gas inlet 112 at a rate controlled by valve 113. The gas passes through throat portion 109 wherein baffle 114 serves to direct the gas stream along, and substantially parallel to, the inside of barrier 107. Simultaneously, the sweep gas, e. g., steam, is introduced into manifold 104 and passes via conduits 103 into the body of the unit and along the outside of barrier 107 in a direction countercurrent to that of the feed gas passing along the inside of the barrier. As the feed gas passes along barrier 107, the lightest component, i. e., the hydrogen, diffuses through the openings in the barrier and is swept away from the barrier by the stream of sweep gas. The enriched gas, i. e., the mixture of sweep gas and hydrogen, is withdrawn from the unit through conduits 105 and passes via manifold 106 to a sweep gas separator, not shown. The lean gas, i. e., the hydrogen-depleted feed gas, passes through upper throat portion 108 and is withdrawn from the unit through conduit 110 at a rate controlled by valve 111.

Figure 3 shows a somewhat different type of sweep diffusion unit having a plurality of means for introducing the feed and sweep gases on opposite sides of the barrier. Said unit comprises a rectangular box 200 which may suitably be constructed of sheet metal. Usually such box is covered with a layer of thermal insulation to minimize heat losses to the atmosphere. Alternatively, it may be "traced" with steam lines. The barrier 201, shown constructed of fine-mesh screen, is positioned within the box to correspond with the longitudinal central plane thereof, being held in place by upper and lower supporting members 202 and 203, respectively. Feed gas inlets 204 are spaced equidistantly apart along one side of the barrier and perpendicular to the lateral plane thereof, and extend through the top of the box to be joined by a feed gas manifold 205. A sweep gas inlet 206 is positioned parallel to each of feed gas inlets 204, but on the opposite side of the barrier therefrom. Sweep gas inlets extend through the top of the box and are joined by a sweep gas manifold 207. The feed gas inlets 204 and sweep gas inlets are identical, and each consists of a simple tube having a row of small holes drilled along that portion of its length which is coextensive with barrier 201. If desired, each tube may be provided with two rows of holes spaced 180° apart. Figure 4 shows another type of inlet comprising a tube having two narrow slots extending lengthwise along the tube and spaced 180° apart. Figure 5 shows an alternative type comprising a square conduit having opposite faces constructed of fine-mesh screen. Regardless of the type of inlets employed, they should be so positioned with respect to the barrier that a gas introduced into the inlet will issue from the openings therein in a direction substantially parallel to the longitudinal plane of the barrier. Rich and lean gas outlet means 208 and 209, respectively, are provided at one end of box 200 on opposite sides of the barrier. Operation of this apparatus is as previously described. The feed gas is introduced into the unit through manifold 205 and is distributed and caused to flow along the barrier by inlets 204. Similarly, the sweep gas is introduced through manifold 207 and is distributed along the opposite side of the barrier by inlets 206. The hydrogen component of the feed gas preferentially diffuses through the barrier and is swept away from the barrier and out of the unit through rich gas outlet 208 by the stream of sweep gas. The hydrogen-depleted feed gas passes out of the unit through lean gas outlet 209. If desired, the inlet and outlet means may be positioned so that the feed and sweep gases move in opposite directions along their respective sides of the barrier.

As previously stated, the sweep diffusion operation may be carried out in a number of separate stages arranged in various ways. Figure 7 diagrammatically illustrates one type of three-stage scheme. The feed and sweep gas are introduced into a first diffusion unit 300 through lines 301 and 302, respectively. Within unit 300, preferential diffusion of the hydrogen component of the feed gas is effected as above explained to give a hydrogen-rich gas and hydrogen-lean gas. The latter is passed through cooler 303 wherein the sweep gas is condensed to a liquid, thence to separator 304 wherein the condensed sweep medium is separated, and thence via line 305 into the feed side of second diffusion unit 306. Sweep gas is supplied to second diffusion unit 306 through line 307. The hydrogen-enriched gas withdrawn from second diffusion unit 306 is passed through cooler 308 wherein the sweep gas is condensed, thence to separator 309 wherein the condensate is removed, and thence is returned via line 310 to the feed side of first diffusion unit 300 for further enrichment. The hydrogen-depleted lean gas withdrawn from second diffusion unit 306 is passed through cooler 311 wherein the sweep gas is condensed, thence to separator 312 for removal of the condensate, and is finally withdrawn from the system via line 313 as the lean gas product.

The rich gas withdrawn from first diffusion unit 300 is passed through cooler 314 wherein the sweep gas is condensed, thence to separator 315 for removal of the condensate, and thence via line 316 to the feed side of third diffusion unit 317. Sweep gas is supplied to third diffusion unit 317 through line 318. The lean gas withdrawn from third diffusion unit 317 is passed through cooler 319, wherein the sweep gas is condensed, then to separator 320 for removal of the condensate, and thence is returned via line 321 to the feed side of first diffusion unit 300 for further enrichment. The rich gas withdrawn from third diffusion unit 317 is passed to cooler 322 wherein the sweep gas is condensed, then through separator 323 for removal of the condensate, and is finally withdrawn from the system through line 324 as the rich gas product.

It will be apparent to those skilled in the art that various other schemes involving series, parallel, or cascade arrangements of any number of sweep diffusion stages may be employed to effect the desired separation. It will also be apparent that the apparatus employed may take various forms. The principle of the sweep diffusion step lies in passing the feed gas and an inert condensible sweep gas tangentially along opposite sides of a perforate barrier while maintaining a minimum pressure differential across the barrier, whereby the lightest component of the feed gas which preferentially diffuses through the barrier is swept away therefrom and out of the system by the sweep gas.

After separation of the sweep gas, the rich gas produced by the sweep diffusion operation comprises hydrogen in admixture with nitrogen and small amounts of carbon monoxide and other impurities. The concentration of hydrogen in such gas will depend upon the overall enrichment factor of the sweep diffusion operation. As previously stated, the hydrogen-containing gas which is recycled to the reaction step should contain at least 30 per cent, preferably at least 85 per cent, by volume of hydrogen, and accordingly the sweep diffusion step should be operated to produce a hydrogen-containing gas of suitable concentration. Such gas is recycled back to the reaction step as explained above, so that the process operates with substantially no overall consumption of hydrogen.

*The acetylene recovery step*

After separation of the sweep gas, the lean gas produced by the sweep diffusion operation comprises acetylene, nitrogen, unreacted hydrocarbon, and small amounts of carbon oxides and hydrocarbon by-products. Separation of the acetylene from such mixture may be effected in various ways, selective solvent extraction and selective adsorption on solid adsorbents being particularly suitable. Thus, the gas mixture may be countercurrently contacted with an acetylene solvent in a conventional absorption tower which may be of the packed or bubble-cap type, whereby the acetylene is selectively dissolved in the solvent and the remaining components of the gas mixture are removed from the tower and disposed of. The acetylene-rich solvent is passed to a rectification column where the acetylene is distilled off and recovered in substantially pure form as the primary product of the process. The lean solvent is then recycled to the extraction tower for reuse in extracting the acetylene from a further quantity of gas. A number of solvents are satisfactory for use in recovering the acetylene in this manner, e. g., dimethyl formamide, acetonitrile, nitrobenzene, chlorinated hydrocarbons, and various polyglycols and their esters. Solvents having high solvent power for acetylene combined with low vapor pressure are the most satisfactory. As will be apparent to those skilled in the art, various other conventional solvent extraction procedures may be adapted and applied to the present recovery operation.

A particularly advantageous method for recovering the acetylene from the lean gas produced by the sweep diffusion operation comprises selectively adsorbing the acetylene on a moving bed of activated charcoal or other suitable solid adsorbent. Such operation may be carried out by the known "Hypersorption" technique, whereby the acetylene-containing lean gas is passed upwardly through a bed of solid adsorbent which descends by gravity through a suitable tower under such conditions that the acetylene is preferentially adsorbed. The non-adsorbed gas passes from the top of the tower, and the acetylene-rich adsorbent passes through a stripping zone where the acetylene is desorbed therefrom by steam stripping or heating. The steam is separated from the acetylene product by condensation, and the adsorbent is cooled and returned to the top of the tower for re-use in adsorbing further quantities of acetylene from the feed gas. When the hydrocarbon reactant is low-cost methane or natural gas, it is usually of no great economic advantage to process the lean gas for separation of the methane or natural gas for re-use in the reaction step. If desired, however, through the use of special techniques familiar to those skilled in the adsorption art, it is possible to operate the process to obtain a side-cut product comprising the unreacted hydrocarbon which may be recycled to the reaction step. Other techniques for effecting gas separation on solid adsorbents may be adapted to the present operation, and the fact that the acetylene is in admixture with a relatively large quantity of inert nitrogen is of definite advantage where the adsorption is carried out under increased pressure.

The following example will illustrate practice of the process of the invention, but is not to be construed as limiting the same.

EXAMPLE

The reactor employed is similar to that illustrated in Figure 1, except that the preheating zone comprises six separate tubes arranged in a circular pattern exposed directly to the burners of the furnace. The feed gas is introduced into four of such tubes and the hydrogen-containing recycle gas is introduced in the remaining tubes. Within the furnace, these tubes terminate in a single large tube which constitutes the reaction zone. The length of the preheating zone is 34 inches and the water quench is positioned so that the length of the reaction zone is 27½ inches. Reaction conditions are as follows:

Feed gas:
Air _____ 75.0% by vol.
Natural gas _____ 25.0% by vol.
Recycle gas:
Hydrogen _____ 83.0% by vol.
Nitrogen _____ 14.0% by vol.
Methane, etc _____ 3.0% by vol.
Feed gas rate _____ 433 s. c. f. h.
Recycle gas rate _____ 226 s. c. f. h.
Ratio, hydrogen/natural gas _____ 1.4/1.
Preheat temperature _____ 980° C.
Preheat time _____ 0.009 sec.
Reaction temperature _____ 1300° C.
Reaction time _____ 0.0023 sec.

The composition of the product gas on a water-free basis is approximately:

| | Per cent by vol. |
|---|---|
| Acetylene | 3.7 |
| Carbon monoxide | 7.7 |
| Carbon dioxide | 1.1 |
| Hydrogen | 33.3 |
| Oxygen | 0.1 |
| Methane | 3.2 |
| Ethylene | 0.2 |
| Nitrogen | 50.7 |
| | 100.0 |

The yield of acetylene is about 37 per cent based on the amount of hydrocarbon employed, and about 45 per cent based on the amount of hydrocarbon consumed.

The quenched product gas is taken from the reactor at a temperature of about 525° C. and is passed through a waste-heat boiler wherein it is cooled to about 90° C. and produces part of the steam employed in the subsequent sweep diffusion operation. After separating the condensate, the cooled product gas is passed to a single-stage sweep diffusion unit. The latter comprises a simple insulated rectangular box divided longitudinally into two equal chambers by means of a barrier constructed of No. 00 mesh, 26 g. perforated brass sheet having 625 perforations per square inch. The nominal diameter of the perforations is 1/64 inch, and the distance from the wall of each chamber to the barrier is 2¾ inches. The product gas is introduced in one end of one chamber, and steam is introduced into the opposite end of the other chamber. The product gas and steam thus pass through the chamber and along opposite sides of the barrier in opposite directions. The ratio of steam to product gas is about 5.4/1. The rich gas withdrawn from the steam side of the barrier contains about 54 per cent by volume of steam and about 46 per cent by volume of a recycle gas mixture containing about 83 per cent by volume of hydrogen, about 14 per cent by volume of nitrogen, and about 3 per cent by volume of methane, carbon monoxide and acetylene. This gas is cooled to condense the steam, and after separation of the condensate is returned to the acetylene reactor. The lean gas comprises about 46 per cent by volume of steam, the remainder consisting essentially of acetylene, nitrogen and carbon monoxide. After cooling to condense the steam, and separation of the condensate, this gas is passed to a solvent extraction tower wherein it is countercurrently contacted with dimethyl formamide. The acetylene-rich solvent is then heated to drive off the dissolved acetylene, which is recovered in a purity of about 98 per cent.

Other modes of applying the principle of my invention may be employed instead of those explained, change being made as regards the materials and apparatus employed, provided the steps stated by the following claims, or the equivalent of such stated steps, be employed.

I, therefore, particularly point out and distinctly claim as my invention:

1. The process for the production of acetylene which comprises preheating a reactant gas comprising a hydrocarbon and oxygen to a temperature below that at which reaction between the components of said reactant gas occurs to any substantial extent but such that upon the subsequent admixture of the preheated reactant gas with a hydrogen-containing recycle gas an exothermic acetylene-producing reaction occurs in which a temperature between about 1100° C. and about 1500° C. is attained; admixing the preheated reactant gas with said hydrogen-containing recycle gas in the substantial absence of a catalyst whereby said reaction occurs with the formation of a hot product gas; cooling said hot product gas to a temperature at which substantially no further reaction occurs within from about 0.001 to about 0.05 second after said admixing of the hydrogen-containing recycle gas with the preheated reactant gas; passing the cooled product gas in indirect heat exchange relationship with a vaporizable liquid having a boiling point below the temperature of the cooled product gas and the vapors of which are inert with respect to the product gas, thereby vaporizing said liquid to form a sweep gas; passing the product gas and the sweep gas substantially parallel to opposite sides of a perforate diffusion barrier while maintaining a minimum pressure differential across said barrier; withdrawing a hydrogen-rich gas from the sweep gas side of said barrier and separating the aforesaid hydrogen-containing recycle gas therefrom; and withdrawing a hydrogen-lean gas from the product gas side of said barrier and separating acetylene therefrom.

2. The process for the production of acetylene which comprises preheating a reactant gas comprising a non-aromatic hydrocarbon and oxygen in a ratio of between about 0.02 and about 2.0 moles of hydrocarbon per mole of oxygen to a temperature below that at which reaction between the components of said reactant gas occurs to any substantial extent but such that upon subsequent admixture of the preheated reactant gas with a hydrogen-containing recycle gas comprising from about 30 to 100 per cent by volume of free hydrogen and from about 70 to zero per cent by volume of substantially inert components of the subsequently obtained product gas an exothermic acetylene-producing reaction occurs in which a temperature between about 1100° C. and about 1500° C. is attained; admixing the preheated reactant gas with a hydrogen-containing recycle gas of said composition in the substantial absence of a catalyst whereby said reaction occurs with the formation of a hot product gas; cooling said hot product gas to a temperature at which substantially no further reaction occurs within from about 0.001 to about 0.05 second after said admixing of the hydrogen-containing recycle gas with the preheated reactant gas; passing the cooled product gas in indirect heat exchange relationship with a liquid having a boiling point below the temperature of the cooled product gas and the vapors of which are inert with respect to the product gas, thereby vaporizing said liquid to form a sweep gas; passing the sweep gas and product gas substantially parallel to opposite sides of a perforate diffusion barrier while maintaining a minimum pressure differential across said barrier; withdrawing a hydrogen-rich gas from the sweep gas side of said barrier and separating the aforesaid hydrogen-containing recycle gas therefrom; and withdrawing a hydrogen-lean gas from the product gas side of said barrier and separating acetylene therefrom.

3. A process according to claim 2, wherein the reactant gas comprises oxygen and a hydrocarbon selected from the class consisting of natural gas and methane, the mole ratio of hydrocarbon to oxygen being between about 1.33/1 and about 2.0/1.

4. A process according to claim 2 wherein the reactant gas comprises from about 17 to about 30 per cent by volume of a hydrocarbon selected from the class consisting of natural gas and methane and from about 83 to about 70 per cent by volume of air.

5. A process according to claim 2 wherein the hydrogen-containing recycle gas comprises at least about 85 per cent by volume of free hydrogen and less than about 15 per cent by volume of substantially inert components of the product gas selected from the class consisting of nitrogen, carbon monoxide, unreacted hydrocarbon and mixtures of the same.

6. A process according to claim 2 wherein the vaporizable liquid is water.

7. A process according to claim 2 wherein the direction of flow of the sweep gas along the diffusion barrier is opposite to that of the product gas.

8. The process for the production of acetylene which comprises preheating a reactant gas comprising a normally gaseous saturated aliphatic hydrocarbon and sufficient air to provide a mole ratio of hydrocarbon to oxygen between about 1.33/1 and about 2.0/1 to a temperature between about 600° C. and about 1150° C. at which substantially no reaction occurs between the components of said reactant gas; admixing the preheated reactant gas with a hydrogen-containing recycle gas comprising at least about 85 per cent by volume of free hydrogen and less than about 15 per cent by volume of substantially inert components of the subsequently obtained product gas in the substantial absence of a catalyst, whereby there is induced an exothermic acetylene-producing reaction and a rise in temperature to a value between about 1100° C. and about 1500° C.; cooling the hot product gas which is thereby formed to a temperature between about 200° C. and about 600° C. within from about 0.001 to about 0.05 second after said admixing of the hydrogen-containing recycle gas with the preheated reactant gas; passing the cooled product gas in indirect heat exchange relationship with a vaporizable liquid having a boiling point below about 200° C. and the vapors of which are inert with respect to the product gas, thereby vaporizing said liquid to form a sweep gas; passing the product gas and the sweep gas substantially parallel to opposite sides of a perforate diffusion barrier while maintaining a minimum pressure differential across said barrier; withdrawing a hydrogen-rich gas from the sweep gas side of said barrier and separating the aforesaid hydrogen-containing recycle gas therefrom; and withdrawing a hydrogen-lean gas from the product gas side of said barrier and separating acetylene therefrom.

9. The process of claim 7 wherein sufficient of the hydrogen-containing recycle gas is admixed with the preheated reactant gas to provide between about 1.5 and about 3 moles of hydrogen per mole of the hydrocarbon component of the reactant gas.

10. The process of claim 7 wherein the hydrogen-containing recycle gas is preheated to substantially the same temperature as the reactant gas prior to its admixture therewith.

11. The process of claim 7 wherein the vaporizable liquid is water.

12. The process for the production of acetylene which comprises preheating a reactant gas comprising from about 17 to about 30 per cent by volume of a hydrocarbon selected from the class consisting of natural gas and methane and between about 83 and about 70 per cent by volume of air to a temperature between about 600° C. and about 1150° C. at which substantially no reaction occurs between the components of said reactant gas; admixing the preheated reactant gas with sufficient of a preheated hydrogen-containing recycle gas comprising at least about 85 per cent by volume of free hydrogen and less than about 15 per cent by volume of substantially inert components of the subsequently obtained product gas in the substantial absence of a catalyst to induce an exothermic acetylene-producing reaction and a rise in temperature to a value between about 1100° C. and about 1500° C.; cooling the hot product gas which is thereby formed to a temperature above about 200° C. at which substantially no further reaction occurs within from about 0.001 to about 0.05 second after said admixing of the preheated hydrogen-containing recycle gas with the preheated reactant gas; passing the cooled product gas in indirect heat exchange relationship with water so as to further cool the product gas and vaporize said water to form steam; passing the cooled product gas and steam along opposite sides of a perforate diffusion barrier while maintaining a minimum pressure differential across said barrier; withdrawing a mixture of said hydrogen-containing recycle gas and steam from the steam side of said barrier; cooling said mixture of hydrogen-containing recycle gas and steam to condense and separate the steam component thereof; returning the hydrogen-containing recycle gas to the aforesaid admixing step; and withdrawing a mixture of steam and product gas depleted in hydrogen-containing recycle gas from the product gas side of said barrier and separating acetylene therefrom.

13. The process for the production of acetylene which comprises preheating a reactant gas comprising from about 17 to about 30 per cent by volume of a hydrocarbon selected from the class consisting of natural gas and methane and between about 83 and about 70 per cent by volume of air to a temperature between about 600° C. and about 1150° C. at which substantially no reaction occurs between the components of said reactant gas; admixing the preheated reactant gas with sufficient of a preheated hydrogen-containing recycle gas comprising at least about 85 per cent by volume of free hydrogen and less than about 15 per cent by volume of substantially inert components of the subsequently obtained product gas in the substantial absence of a catalyst to induce an exothermic acetylene-producing reaction and a rise in temperature to a value between about 1100° C. and about 1500° C.; cooling the hot product gas which is thereby formed to a temperature above about 200° C. at which substantially no further reaction occurs within from about 0.001 to about 0.05 second after said admixing of the preheated hydrogen-containing recycle gas with the preheated reactant gas; passing the cooled product gas in indirect heat exchange relationship with water so as to further cool the product gas and vaporize said water to form steam; passing the cooled product gas and steam along opposite sides of a perforate diffusion barrier while maintaining a minimum pressure differential across said barrier; withdrawing a mixture of said hydrogen-containing recycle gas and steam from the steam side of said barrier and separating said hydrogen-containing recycle gas therefrom; withdrawing a mixture of steam and product gas depleted in hydrogen-containing recycle gas from the product gas side of said barrier; cooling said mixture of steam and product gas depleted in hydrogen-containing recycle gas to condense and separate the steam therefrom; and subjecting the product gas depleted in hydrogen-containing recycle gas to selective solvent extraction to separate acetylene therefrom.

14. A process according to claim 12 wherein the hydrocarbon component of the reactant gas is natural gas.

15. In a process for producing acetylene wherein (1) a reactant gas comprising air and a hydrocarbon selected from the class consisting of natural gas and methane is preheated to a temperature below that at which reaction between the components of said reactant gas takes place to any substantial extent but such that upon the subsequent admixture of the preheated reactant gas with a gas comprising free hydrogen an exothermic acetylene producing reaction occurs in which a reaction temperature between about 1100° C. and 1500° C. is attained, (2) said preheated reactant gas is admixed with said gas comprising free hydrogen whereby said reaction occurs and said reaction temperature is attained with the formation of a hot product gas, and (3) said hot product gas is cooled to a temperature substantially above about 100° C. but below that at which substantially no further reaction occurs within from about 0.001 to about 0.05 second after said admixing of the gas comprising free hydrogen with the preheated reactant gas; the improvement which consists in passing said cooled product gas in heat exchange relationship with water to vaporize said water and form steam, and thereafter separating a gas comprising free hydrogen from said product gas by a sweep diffusion operation in which said steam is employed as the sweep gas.

References Cited in the file of this patent

UNITED STATES PATENTS

| Number | Name | Date |
|---|---|---|
| 1,496,757 | Lewis et al. | June 3, 1924 |
| 2,159,434 | Frey | May 23, 1939 |
| 2,512,259 | Pike | June 20, 1950 |
| 2,549,240 | Robinson | Apr. 17, 1951 |
| 2,552,277 | Hasche | May 8, 1951 |
| 2,572,664 | Robinson | Oct. 23, 1951 |

FOREIGN PATENTS

| Number | Country | Date |
|---|---|---|
| 332,731 | Great Britain | July 31, 1930 |